(12) United States Patent
Kimura et al.

(10) Patent No.: US 8,785,078 B2
(45) Date of Patent: Jul. 22, 2014

(54) FUEL CELL

(75) Inventors: Hiroko Kimura, Toyota (JP); Naoki Takehiro, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 199 days.

(21) Appl. No.: 13/060,592

(22) PCT Filed: Oct. 10, 2008

(86) PCT No.: PCT/JP2008/068447
§ 371 (c)(1),
(2), (4) Date: Apr. 13, 2011

(87) PCT Pub. No.: WO2010/041332
PCT Pub. Date: Apr. 15, 2010

(65) Prior Publication Data
US 2011/0183238 A1    Jul. 28, 2011

(51) Int. Cl.
| | | |
|---|---|---|
| H01M 2/30 | (2006.01) | |
| H01M 2/40 | (2006.01) | |
| H01M 8/24 | (2006.01) | |
| H01M 8/10 | (2006.01) | |
| H01M 2/14 | (2006.01) | |
| H01M 8/04 | (2006.01) | |
| H01M 8/02 | (2006.01) | |

(52) U.S. Cl.
CPC .......... *H01M 8/0202* (2013.01); *H01M 8/0204* (2013.01); *H01M 8/023* (2013.01); *H01M 8/0247* (2013.01); *H01M 8/1018* (2013.01); *H01M 8/04835* (2013.01); *H01M 8/04291* (2013.01); *H01M 2008/1095* (2013.01)

USPC .......... 429/518; 429/512; 429/516; 429/456; 429/457; 429/465; 429/481

(58) Field of Classification Search
USPC .......... 429/512, 516, 518, 456, 457, 465, 481
See application file for complete search history.

(56) References Cited

U.S. PATENT DOCUMENTS

| | | |
|---|---|---|
| 4,767,680 A | 8/1988 | Hijikata et al. |
| 2002/0076584 A1 | 6/2002 | Gebhardt et al. |
| 2003/0091883 A1 | 5/2003 | Peled et al. |

(Continued)

FOREIGN PATENT DOCUMENTS

| | | |
|---|---|---|
| EP | 0 158 583 A2 | 10/1985 |
| JP | 58-145066 A | 8/1983 |

(Continued)

OTHER PUBLICATIONS

Extended European Search Report dated Apr. 2, 2013, issued in European Patent Application No. 08877280.1.

*Primary Examiner* — Eugenia Wang
(74) *Attorney, Agent, or Firm* — Sughrue Mion, PLLC

(57) ABSTRACT

The present invention provides a fuel cell which is capable of improving electric power generation efficiency at a time of high-temperature operation. The fuel cell 10 comprising: a membrane electrode assembly 4; and a pair of gas separators 7, 8 sandwiching the membrane electrode assembly 4 therebetween, wherein at least one of the gas separator(s) 7 and/or 8 comprises a compact layer(s) 7c and/or 8c which is capable of preventing permeation of fluid and a porous layer (s) 7d and/or 8d which allows permeation of fluid, and the porous layer(s) 7d and/or 8d is impregnated with a water-soluble liquid having higher boiling point than that of water.

1 Claim, 1 Drawing Sheet

(56) References Cited

U.S. PATENT DOCUMENTS

| | | |
|---|---|---|
| 2004/0023091 A1* | 2/2004 | Wilkinson et al. ............. 429/30 |
| 2007/0099048 A1* | 5/2007 | Takasu et al. .................. 429/26 |
| 2007/0243446 A1 | 10/2007 | Hamrock et al. |

FOREIGN PATENT DOCUMENTS

| | | |
|---|---|---|
| JP | 63-024561 A | 2/1988 |
| JP | 08-001803 B | 1/1996 |
| JP | 08-180890 A | 7/1996 |
| JP | 9-115539 A | 5/1997 |
| JP | 2001-351666 A | 12/2001 |
| JP | 2005-235666 A | 9/2005 |
| JP | 2006-508494 A | 3/2006 |
| JP | 2007-012327 A | 1/2007 |
| WO | 03/077341 A2 | 9/2003 |
| WO | 2004/051818 A2 | 6/2004 |
| WO | 2008/030246 A2 | 3/2008 |

* cited by examiner

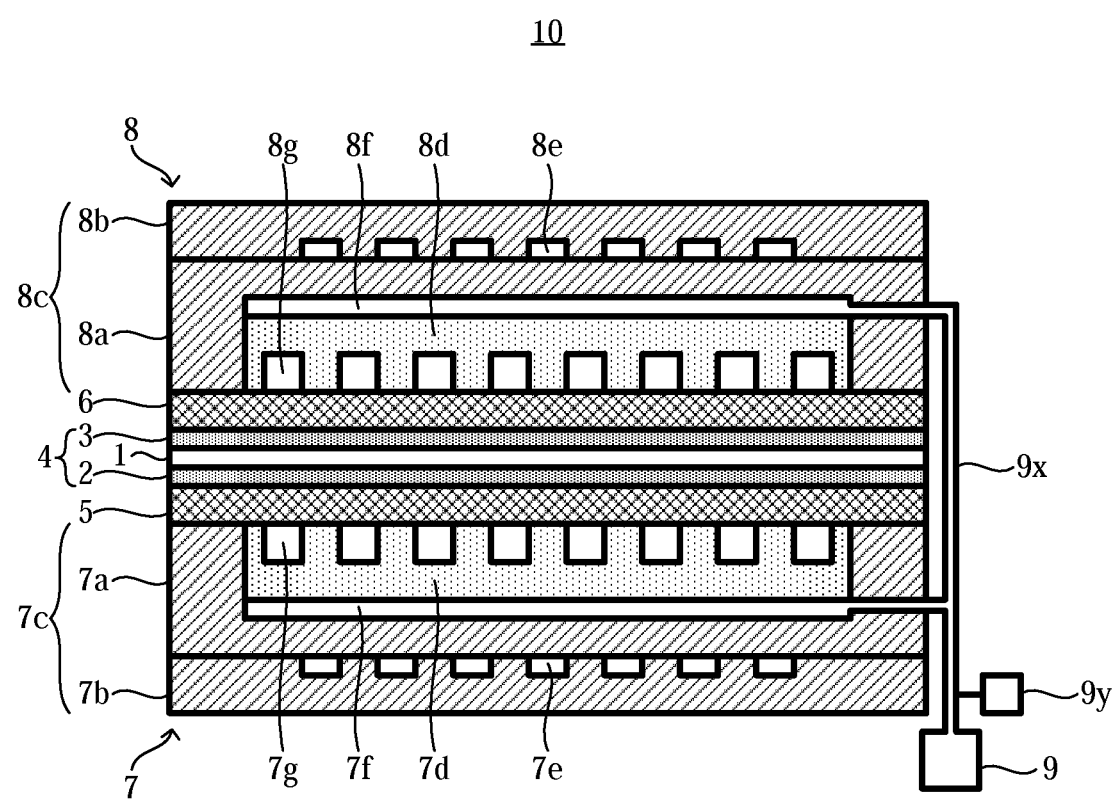

FUEL CELL

CROSS REFERENCE TO RELATED APPLICATIONS

This application is a National Stage of International Application No. PCT/JP2008/068447 filed on Oct. 10, 2008, the contents of all of which are incorporated herein by reference in their entirety.

TECHNICAL FIELD

The present invention relates to a fuel cell.

BACKGROUND ART

A fuel cell is an apparatus which generates electrochemical reaction in a membrane electrode assembly (hereinafter, referred to as "MEA".) comprising an electrolyte layer (hereinafter, referred to as "electrolyte membrane".) and electrodes (an anode catalytic layer and an cathode catalytic layer) arranged on both sides of the electrolyte membrane, and which extracts electrical energy generated by the electrochemical reaction to outside. Among various fuel cells, solid polymer electrolyte fuel cell (hereinafter, referred to as "PEFC".) used for domestic cogeneration system, automobiles, and so on can be actuated in a low temperature region. Because of its energy conversion efficiency, short start-up time, and small-sized and lightweight system, the PEFC has received attention as a power source of a battery car or a portable power supply.

A unit cell of the PEFC comprises a MEA and a pair of current collectors sandwiching the MEA therebetween; the MEA contains a proton conductive polymer which expresses proton conductance under moisture state. During the operation of PEFC, a hydrogen-based gas (hereinafter, referred to as "hydrogen".) is supplied to the anode, meanwhile an oxygen-based gas (hereinafter, referred to as "air".) is supplied to the cathode. The hydrogen which supplied to the anode is separated into proton and electron under the action of catalyst contained in the anode's catalytic layer (hereinafter, referred to as "anode catalytic layer".); the proton generated from the hydrogen reaches a cathode's catalytic layer (hereinafter, referred to as "cathode catalytic layer".) through an anode catalytic layer and an electrolyte membrane. On the other hand, the electron reaches a cathode catalytic layer through external circuit; by having such a process, it is capable of extracting the electrical energy. Then, reaction of the proton and the electron reached the cathode catalytic layer with oxygen contained in the air which is supplied to the cathode catalytic layer produces water.

During the operation of PEFC, water distribution in the unit cell sometimes becomes uneven. When water distribution in the unit cell becomes uneven, in a dried portion where water is little, proton conductive-resistance of the electrolyte membrane increases whereby the electric power generation efficiency tends to decrease; in a wet portion where water is pooled, the excessive water prevents the diffusion of gas, which tends to lower the electric power generation efficiency. Due to these reasons, in order to improve electric power generation efficiency, homogenization of water distribution in the unit cell is strongly demanded.

As an art for the purpose of homogenization of water distribution in the unit cell, for example, Patent document 1 discloses a fuel cell which comprises a gas separator having a compact layer and a porous portion, wherein the porous portion of the gas separator except for the porous portion is used for preservation of electrolytic solution. In addition, Patent document 2 discloses a fuel cell system comprising a plate where a reactant flow path and a liquid flow path are separated by a porous material, wherein pressure difference is given between upstream and downstream of the reactant flow path, reactant is humidified at the upstream of the reactant flow path and liquid water of the reactant is removed at the downstream of reactant flow path.

Patent Document 1: Japanese Patent Application Examined No. 8-1803

Patent document 2: International Publication No. WO 2004/51818

DISCLOSURE OF THE INVENTION

Problems to be solved by the Invention

The art of Patent document 1 enables to preserve the electrolyte in the porous portion and to transfer water in the unit cell through porous portion, thereby it is presumably possible to homogenize water distribution in the unit cell. However, by the art of Patent document 1, when the fuel cell is operated at high temperature, large quantity of evaporated water is removed from the unit cell, which makes homogenization of water distribution in the unit cell difficult. As a result, the art of Patent document 1 has a problem that the electric power generation efficiency during high-temperature operation tends to lower. The problem can hardly be solved even by a combination of the art of Patent document 1 and Patent document 2.

Accordingly, an object of the present invention is to provide a fuel cell which can improve electric power generation efficiency during high-temperature operation.

Means for Solving the Problems

In order to solve the above problems, the present invention takes the following means. That is, the fuel cell comprising: a membrane electrode assembly; and a pair of gas separators sandwiching the membrane electrode assembly therebetween, wherein at least one of the gas separators comprises a compact layer which is capable of preventing permeation of fluid and a porous layer which allows permeation of fluid, and the porous layer is impregnated with a water-soluble liquid having higher boiling point than that of water.

In the above invention, a liquid flow path for transporting the water-soluble liquid having higher boiling point than that of water is preferably provided in the interface between the compact layer and the porous layer, and/or in the porous layer.

Further, in the above invention, the water-soluble liquid having higher boiling point than that of water is preferably a dilute sulfuric acid.

Effects of the Invention

According to the present invention, since a water-soluble liquid having higher boiling point than that of water is impregnated in the porous layer (s), it is possible to inhibit water evaporation even during high-temperature operation. That is, according to the invention, even during high-temperature operation, it is possible to transfer water contained in the unit cell through the porous layers, which is capable of homogenizing water distribution in the unit cell. Therefore, the invention can provide a fuel cell which is possible to improve electric power generation efficiency during high-temperature operation.

Moreover, in the invention, since a liquid flow path is arranged in the interface of the compact layer and the porous layer and/or in the porous layer, impregnating a water-soluble liquid having higher boiling point than that of water into the porous layer becomes easier.

Further, in the invention, when the water-soluble liquid having higher boiling point than that of water is a dilute sulfuric acid, in addition to the above effect, poisoning of catalyst contained in the membrane electrode assembly can be inhibited. Therefore, improvement of electric power generation efficiency of the fuel cell can be easier.

BRIEF DESCRIPTION OF THE DRAWINGS

FIG. 1 is a schematic view showing an embodiment of the fuel cell of the present invention.

DESCRIPTION OF THE REFERENCE NUMERALS 1 electrolyte membrane
2 catalytic layer
3 catalytic layer
4 MEA (membrane electrode assembly)
5 gas diffusion layer
6 gas diffusion layer
7 separator (gas separator)
7a solid flow-path plate
7b cooling-water path plate
7c compact layer
7d porous layer
7e cooling-water path
7f liquid flow path
7g gas flow path
8 separator
8a solid flow-path plate
8b cooling-water path plate
8c compact layer
8d porous layer
8e cooling-water path
8f liquid flow path
8g gas flow path
9 liquid tank
9x liquid passage
9y pump
10 fuel cell Best Mode for Carrying Out the Invention In a PEFC, water is produced during its operation. In order to inhibit lowering of proton conductivity, a moisturized reaction gas is supplied to the unit cell. However, the produced water is movable together with the reaction gas, for instance, MEA tends to be dried at the vicinity of reaction gas inlet and the produced water tends to be piled up at the vicinity of reaction gas outlet. When the MEA is dried, proton conductive-resistance increases, so that electric power generation efficiency of PEFC lowers. Moreover, when the produced water is piled up, diffusion of reaction gas becomes disturbed. Hence, occurrence frequency of the electrochemical reaction lowers, and electric power generation efficiency of the PEFC lowers. Because of these, in order to improve electric power generation efficiency of the PEFC, homogenization of water distribution in the unit cell is preferred. So as to achieve the purpose, conventionally, fuel cells, wherein water is impregnated in porous portion of the gas separator (hereinafter, referred to as "separator".), have been disclosed. Nevertheless, in the conventional arts, large quantity of water is evaporated during high-temperature operation; homogenization of water distribution in the unit cell has been difficult; thereby improvement of electric power generation efficiency during high-temperature operation has been difficult. In order to improve electric power generation efficiency during high-temperature operation, inhibiting water evaporation during high-temperature operation seems necessary.

The present invention is developed based on these findings. The main object of the present invention is to provide a fuel cell which is capable of inhibiting water evaporation even during high-temperature operation by impregnating the porous portion of the separator with water-soluble liquid having higher boiling point than that of water, and which is capable of improving electric power generation efficiency even during high-temperature operation by homogenizing water quantity in the unit cell.

The present invention will now be more specifically described with reference to the drawings. It should be noted that the following embodiment is an example of the invention; the invention is not limited by the embodiment shown in the drawings.

FIG. 1 shows an embodiment of a fuel cell 10 of the present invention. In FIG. 1, cross section of the unit cell provided in the fuel cell 10 of the invention is schematically shown. As shown in FIG. 1, the fuel cell 10 (hereinafter, it may be referred to as "unit cell 10".) of the present invention comprises: a membrane electrode assembly 4 (hereinafter, referred to as "MEA 4".) including an electrolyte membrane 1, a catalytic layer 2 disposed on one surface of the electrolyte membrane 1, and a catalytic layer 3 disposed on the other surface of the electrolyte membrane 1; a gas diffusion layer 5 arranged on the side of catalytic layer 2; a gas diffusion layer 6 arranged on the side of catalytic layer 3; a separator 7 arranged outside of the gas diffusion layer 5; and a separator 8 arranged outside of the gas diffusion layer 6. In the electrolyte membrane 1, the catalytic layer 2, and the catalytic layer 3, polymers having proton conductivity are contained; moreover, in the catalytic layer 2 and the catalytic layer 3, a substance (hereinafter, referred to as "catalyst".) which functions as a catalyst for electrochemical reaction occurred during the operation of fuel cell 10 is contained. In the fuel cell 10, the separator 7 comprises: a compact layer 7c composed by adhering a cooling-water path plate 7b with a solid flow-path plate 7a made of a compact material which does not allow permeation of fluid; and a porous layer 7d arranged at a concave portion of the compact layer 7c. Along the interface of the solid flow-path plate 7a and the cooling-water path plate 7b, cooling-water paths 7e are formed; along the interface of the compact layer 7c and the porous layer 7d, a liquid flow path 7f is formed. Further, in the face of separator 7 opposing to the gas diffusion layer 5 (including the face of gas diffusion layer 5 side of the porous layer 7d), gas flow paths 7g for distributing reaction gas are formed. On the other hand, the separator 8 comprises a compact layer 8c which is composed by adhering a cooling-water path plate 8b with a solid flow-path plate 8a made of a compact material which does not allow permeation of fluid; and a porous layer 8d arranged at a concave portion of the compact layer 8c. Along the interface of the solid flow-path plate 8a and the cooling-water path plate 8b, cooling-water paths 8e are formed; along the interface of the compact layer 8c and the porous layer 8d, a liquid flow path 8f is formed. Further, in the face of separator 8 opposing to the gas diffusion layer 6 (including the face of gas diffusion layer 6 side of the porous layer 8d), gas flow paths 8g for distributing reaction gas are formed. In addition to the above structure, the fuel cell 10 of the present invention has a liquid tank 9 to pool a dilute sulfuric acid supplied to the liquid flow path 7$f$ and the liquid flow path 8$f$. The liquid tank 9 is connected to the liquid flow path 7$f$ and the liquid flow path 8$f$ through liquid passage 9$x$. To the liquid passage 9$x$, a pump 9$y$ is connected to be used for delivering the dilute sulfuric acid preserved in the liquid tank 9 to the liquid passage 9$x$.

During the operation of fuel cell 10, for example, moisturized hydrogen is supplied to the catalytic layer 2 through the gas flow paths 7$g$ and the gas diffusion layer 5; moisturized air is supplied to the catalytic layer 3 through the gas flow paths 8$g$ and the gas diffusion layer 6. The hydrogen supplied to the catalytic layer 2 is separated into a proton and an electron under action of catalyst (e.g. platinum. Same, in below.) contained in the catalytic layer 2; the proton produced in the catalytic layer 2 travels to the catalytic layer 3 through the proton conductive polymer contained in the catalytic layer 2, the electrolyte membrane 1, and the catalytic layer 3. On the other hand, the electron produced in the catalytic layer 2 travels to the catalytic layer 3 via external circuit. Then, oxygen contained in the air supplied to the catalytic layer 3 reacts with proton and electron, which travel from the catalytic layer 2 to the catalytic layer 3, under action of catalyst contained in the catalytic layer 3 to produce water.

As above, during the operation of the fuel cell 10, moisturized hydrogen and air (hereinafter, these may be referred to as "reaction gas" all together.) are supplied. Here, it should be noted that the water produced during the operation tends to travel together with reaction gas towards the outlet of gas flow paths 7$g$ and gas flow paths 8$g$. Therefore, for example, in the face of unit cell 10 where laminating direction of the MEA 4, the gas diffusion layer 5, and so on is defined as the normal line direction, water shortage tends to be caused at the inlet side of the gas flow paths 7$g$ and the gas flow paths 8$g$; water tends to be piled up at the outlet side of the gas flow paths 7$g$ and the gas flow paths 8$g$ or the like. When uneven distribution of water is caused in the face of the unit cell 10 in this way, proton conductive-resistance tends to increase at the dried portion where water shortage is caused; as a result, electric power generation efficiency is lowered. Whereas, at the wet portion where water is piled up, diffusion of reaction gas is disturbed by water; consequently, electric power generation efficiency is lowered. Especially, when the fuel cell is operated at high temperature (e.g., 85° C. or more. Same, in below.), water tends to be evaporated, the area of dried portion expands, which presumably tends to lower electric power generation efficiency. Thus, in order to improve electric power generation efficiency at a time of high-temperature operation, seemingly, homogenization of water distribution in the face of the unit cell 10 and reduction of water evaporation becomes necessary.

From the above point of view, in the fuel cell 10 of the present invention, the porous layer 7$d$ is arranged in the separator 7 and the porous layer 8$d$ is arranged in the separator 8. By arranging the porous layers 7$d$ and 8$d$, water existing in the unit cell 10 can go through fine pores included in these layers so that transporting the water from the wet portion to the dried portion becomes possible. As above, by having such an embodiment which allows water travels from the wet portion to the dried portion, the fuel cell 10 of the invention enables to homogenize water distribution in the face of the unit cell 10. In addition to the above structure, by supplying the dilute sulfuric acid to the liquid flow paths 7$f$ and 8$f$ through the liquid passage 9$x$, the fuel cell 10 of the invention has a configuration where dilute sulfuric acid is held in many pores provided in both of the porous layer 7$d$ and the porous layer 8$d$. It should be noted that saturated vapor pressure of water at 30° C. is 4.25 kPa; whereas saturated vapor pressure of dilute sulfuric acid (60%) at 30° C. is 0.721 kPa and saturated vapor pressure of dilute sulfuric acid (80%) at 30° C. is 0.024 kPa. So, when dilute sulfuric acid is held in the pores of the porous layers 7$d$ and 8$d$ (impregnating the porous layers 7$d$ and 8$d$ with dilute sulfuric acid), compared with the case where water is not mixed with dilute sulfuric acid, saturated vapor pressure of water mixed with dilute sulfuric acid can be lowered. Thus, by impregnating the porous layers 7$d$ and 8$d$ with dilute sulfuric acid, it is possible to suppress water evaporation during high-temperature operation. Namely, according to the fuel cell 10 in which the porous layers 7$d$ and 8$d$ are impregnated with dilute sulfuric acid, even during high-temperature operation, it is possible to transport the water, which has been suppressed evaporation, to the pores of the porous layers 7$d$ and 8$d$. Therefore, such an embodiment allows homogenization of water distribution in the face of the unit cell 10 even during high-temperature operation. As a consequent, by impregnating the porous layer 7$d$ of separator 7 and the porous layer 8$d$ of separator 8 with dilute sulfuric acid, the present invention provides the fuel cell 10 which is capable of improving electric power generation efficiency even during high-temperature operation.

Hence, according to the fuel cell 10 of the invention, suppressing the water evaporation becomes possible; even if the porous layer 7$d$ and the porous layer 8$d$ are impregnated with dilute sulfuric acid, the dilute sulfuric acid and a part of water may still be discharged together with reaction gas to the outside of unit cell 10. When dilute sulfuric acid is discharged to the outside of unit cell 10, amount of the dilute sulfuric acid having been impregnated into the porous layers 7$d$ and 8$d$ decreases which may weaken the effect for suppressing the water evaporation. So, in the fuel cell 10 of the invention, the liquid flow path 7$f$ and the liquid flow path 8$f$ are connected to the liquid tank 9 through liquid passage 9$x$. By this configuration, even if the quantity of dilute sulfuric acid which is impregnated into the porous layers 7$d$ and 8$d$ decreases, it is possible to supply dilute sulfuric acid from the liquid tank 9 through the liquid passage 9$x$. As a result, it becomes possible to maintain the effect for improving electric power generation efficiency during high-temperature operation over the long term.

In the fuel cell 10 of the invention, constructive material of a piping (not shown in the drawings) communicating with the gas flow paths 7$g$ and another piping (not shown in the drawings) communicating with the gas flow paths 8$g$ is not specifically limited to; in view of making a configuration which is capable of inhibiting corrosion by dilute sulfuric acid, the face which contacts with the fluid may preferably be coated with a known resin. Moreover, constructive material of the liquid passage 9$x$ is not specifically limited to, either; in view of having a configuration which is capable of inhibiting corrosion by dilute sulfuric acid, the face which contacts with the dilute sulfuric acid may preferably be coated with a known resin.

Also, in the fuel cell 10 of the present invention, the method to supply dilute sulfuric acid from the liquid tank 9 to the porous layer 7$d$ and/or the porous layer 8$d$ through the liquid passage 9$x$ is not specifically limited to. An example for supplying dilute sulfuric acid from the liquid tank 9 to the porous layer 7$d$ and the porous layer 8$d$ may comprise the step of using the difference between the pressure of liquid tank 9 and that of the liquid flow path 7$f$ or the liquid flow path 8$f$. Other than this, a method for supplying dilute sulfuric acid from the liquid tank 9 to the porous layer 7$d$ and/or the porous layer 8$d$ may be carried out by studying the relation between the operation mode of the fuel cell 10 and discharge of the dilute sulfuric acid in advance, and controlling the performance of the pump 9y so as the pump 9y to work in conjunction with the operation mode.

In the above description related to the present invention, a fuel cell 10 having the liquid flow path 7f formed along the interface between the compact layer 7c and the porous layer 7d and the liquid flow path 8f formed along the interface between the compact layer 8c and the porous layer 8d is shown as an example, the fuel cell of the invention is not limited to the configuration. When the fuel cell of the invention is provided with a liquid flow path, the area where the liquid flow path is provided is not limited to the interface between the compact layer and the porous layer; the liquid flow path may be provided in the porous layer. In addition, the fuel cell of the invention may have a configuration which does not have a liquid flow path. However, in view of making a configuration which is capable of easily charging dilute sulfuric acid to the porous layer, a liquid flow path is preferably provided within the configuration.

When the liquid flow path is provided to the fuel cell of the invention, a method for producing separators having the liquid flow paths is not specifically limited to. As an example thereof, a method for producing separators to which liquid flow path is formed in the interface between the compact layer and the porous layer, by fitting the compact layer and the porous layer wherein liquid flow paths are respectively formed in a face of the porous layer opposing to the concave of the compact layer and/or in a concave of the compact layer. Other than this, a method for producing separators to which liquid flow path is formed in the interface between the compact layer and the porous layer may be carried out by fitting the porous layer to the concave of compact layer so as the gap (i.e. liquid flow path) to be formed between the concave of compact layer and the porous layer. Further, a method for producing the separator having liquid flow paths formed inside the porous layer may be carried out by fitting the compact layer and the porous layer so as an end of the liquid flow path formed inside the porous layer and an end of the liquid passage formed in the compact layer to be connected each other.

Moreover, in the fuel cell 10 of the invention, the porous layer 7d provided to the separator 7 may be arranged to exist over the full-length of the gas flow paths 7g, it may also be arranged to exist in a part of the region of the gas flow paths 7g. In the same manner, in the fuel cell 10 of the invention, the porous layer 8d provided to the separator 8 may be arranged to exist over the full-length of the gas flow paths 8g, it may be arranged to exist in a part of the region of the gas flow paths 8g.

Further, in the above description related to the invention, an embodiment where the porous layers 7d and 8d are impregnated with dilute sulfuric acid is shown; however, the fuel cell of the present invention is not restricted to the embodiment. In the invention, the liquid for impregnating the porous layer of separator may be any kind of water-soluble liquid having higher boiling point than that of water, it is preferably a liquid which does not cause deterioration of catalytic function and catalyst malfunction. In the invention, examples of liquid which are capable of impregnating the porous layer of separator include: dilute sulfuric acid such as dilute sulfuric acid (60%) and dilute sulfuric acid (80%); and mixed solution of a dilute sulfuric acid with an electrolyte solution obtained by dissolving, in a solvent, a proton conductive polymer which can form an electrolyte membrane.

In the fuel cell 10 of the invention, the proton conductive polymer contained in the electrolyte membrane 1, the catalytic layer 2, and the catalytic layer 3 is not specifically restricted to, a known proton conductive polymer which is usable for PEFC may be used. In addition, in the fuel cell 10 in the invention, the catalyst contained in the catalytic layer 2 and the catalytic layer 3 is not specifically limited to, a known catalyst which is usable for PEFC may be used. It should be noted that, in the above description related to the present invention, an embodiment where a proton conductive polymer is contained in the catalytic layer 2 and the catalytic layer 3 is shown; however, the fuel cell of the present invention is not limited to the embodiment, it may have the one where the proton conductive polymer is not contained in the catalytic layer 2 and/or the catalytic layer 3.

Still further, in the fuel cell 10 of the invention, a material composing the compact layers 7c and 8c is not specifically limited to, as long as it can prevent permeation of fluid and be usable as a material for composing separators of PEFC; a known material can be used. Also, in the fuel cell 10 of the invention, a material composing the porous layers 7d and 8d is not specifically limited to, as long as it can allow permeation of fluid and be usable as a material for composing separators of PEFC; a known porous material can be used.

Still further, in the above description related to the present invention, an embodiment in which a compact layer 7c composed by adhering a cooling-water path plate 7b with a solid flow-path plate 7a and a compact layer 8c composed by adhering a cooling-water path plate 8b with a solid flow-path plate 8a is shown; the fuel cell of the invention is not limited to the configuration. If a compact layer of the above embodiment can be integrally formed, it is also possible to form a configuration provided with compact layers formed as a single member.

Still further, in the above description related to the present invention, another embodiment of a fuel cell 10 comprises a separator 7 having a porous layer 7d and a separator 8 having a porous layer 8d; the fuel cell of the present invention is not limited to the configuration. In the fuel cell of the invention, a separator having the porous layer may be disposed at one side of MEA only; that is, it is possible to make a configuration having a separator, where porous layer is not provided at another side of the MEA, is disposed.

Still further, in the above description related to the present invention, an embodiment in which the gas diffusion layers 5 and 6 are provided is shown; however, the fuel cell of the invention is not limited to the embodiment; the one in which either one or both of the gas diffusion layers are not provided may be possible. In order to evenly supplying air to the catalytic layer 2, the catalytic layer 3 and so on, an embodiment where gas diffusion layer 5 and the gas diffusion layer 6 are provided is preferable. When the gas diffusion layers are provided to the fuel cell of the invention, configuration of this gas diffusion layer is not specifically restricted to; any kind of gas diffusion layer which is usable for PEFC can be used.

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that fuel cell with such an alternation are included in the technical scope of the invention.

INDUSTRIAL APPLICABILITY

The fuel cell of the present invention can improve electric power generation efficiency at a time of high-temperature operation, it is possible to use as a power source of battery car driven under the environment of 85° C. or more or as a portable power supply.

The invention claimed is:
1. A solid polymer electrolyte fuel cell comprising:
a membrane electrode assembly; and a pair of gas separators sandwiching said membrane electrode assembly therebetween,
wherein each of said pair of gas separators comprises a compact layer which is capable of preventing permeation of fluid and a porous layer which allows permeation of fluid, and
said porous layer is impregnated with a water-soluble liquid having higher boiling point than that of water,
a liquid flow path for transporting said water-soluble liquid having higher boiling point than that of water is provided in an interface between said compact layer and said porous layer, and/or in said porous layer, and
said water-soluble liquid having higher boiling point than that of water is a dilute sulfuric acid.

* * * * *